US012736895B2

(12) United States Patent
Gotoda

(10) Patent No.: US 12,736,895 B2

(45) Date of Patent: Sep. 15, 2026

(54) PRINTER APPARATUS WITH UPSTREAM TONER RECYCLING FUNCTION

(71) Applicant: AVISION INC., Hsinchu (TW)

(72) Inventor: Katsuhiko Gotoda, Hsinchu (TW)

(73) Assignee: AVISION INC., Hsinchu (TW)

( * ) Notice: Subject to any disclaimer, the term of this patent is extended or adjusted under 35 U.S.C. 154(b) by 0 days.

(21) Appl. No.: 19/012,225

(22) Filed: Jan. 7, 2025

(65) Prior Publication Data

US 2026/0194839 A1 Jul. 9, 2026

(51) Int. Cl.

| | |
|---|---|
| ***G03G 15/00*** | (2006.01) |
| ***G03G 15/04*** | (2006.01) |
| ***G03G 15/08*** | (2006.01) |
| ***G03G 15/095*** | (2006.01) |
| ***G03G 21/00*** | (2006.01) |
| ***G03G 21/12*** | (2006.01) |

(52) U.S. Cl.

CPC ... *G03G 15/0865* (2013.01); *G03G 15/04072* (2013.01); *G03G 15/095* (2013.01); *G03G 21/0005* (2013.01); *G03G 21/12* (2013.01)

(58) Field of Classification Search

CPC ......... G03G 15/04072; G03G 15/0865; G03G 15/095; G03G 21/0005; G03G 21/12

USPC ........................... 399/98, 149, 150, 220, 159

See application file for complete search history.

(56) References Cited

U.S. PATENT DOCUMENTS

| | | | | |
|---|---|---|---|---|
| 7,024,150 | B2 * | 4/2006 | Fukuta | G03G 21/00 399/98 |
| 7,301,656 | B1 | 11/2007 | Nakagiri et al. | |
| 2012/0128397 | A1 | 5/2012 | Chang | |

FOREIGN PATENT DOCUMENTS

| | | | |
|---|---|---|---|
| CN | 102476510 | A | 5/2012 |
| EP | 1008918 | A2 | 6/2000 |

* cited by examiner

*Primary Examiner* — Hoan H Tran

(74) *Attorney, Agent, or Firm* — MUNCY, GEISSLER, OLDS & LOWE, P.C.

(57) ABSTRACT

A printer apparatus with an upstream toner recycling function includes: a drum; a development roller performing a developing operation on the drum; a print head performing an exposure operation on the drum; and a cleaner performing a cleaning operation on the drum. After a light sensing part of the drum is rotated through the print head, the light sensing part firstly passes through the cleaner, which cleans or loosens old toners on the drum, and then passes through the development roller, which attaches new toners to the drum.

7 Claims, 2 Drawing Sheets

PRINTER APPARATUS WITH UPSTREAM TONER RECYCLING FUNCTION

FIELD OF THE INVENTION

This disclosure relates to a printer apparatus, and more particularly to a printer apparatus with an upstream toner recycling function.

DESCRIPTION OF RELATED ART

In the conventional laser printers and copiers, toners in a toner cartridge are used as a development material. In the printing process, waste toners are produced. The conventional practice is to dispose a cleaner downstream of a transfer roller and upstream of a charger, the cleaner is used to clean the toners from a drum, and a toner collecting box is used to collect the toners. When the collected toners of the toner collecting box reach a certain amount, the maintenance man takes the toners out, or replaces a new toner collecting box with the old one. Such mechanical design is complicated, and cannot reduce the amount of the waste toners.

SUMMARY OF THE INVENTION

It is therefore an object of this disclosure is to provide a printer apparatus with an upstream toner recycling function, which can effectively recycle the toners that may be directly used in the printer apparatus, and reduce the waste toners.

To achieve the above-identified object, this disclosure provides a printer apparatus, which includes: a drum; a development roller performing a developing operation on the drum; a print head performing an exposure operation on the drum; and a cleaner performing a cleaning operation on the drum. After a light sensing part of the drum is rotated through the print head, the light sensing part firstly passes through the cleaner, which cleans or loosens old toners on the drum, and then passes through the development roller, which attaches new toners to the drum.

According to the above-mentioned aspect, the cleaner may be provided between the print head and the development roller, to clean or loosen old toners on the drum, so that the old toners can be recycled, and the recycled old toners may be attached to the drum directly by the development roller with the new toners, and may be recycled into the toner cartridge. Because the quality of nearby recycled old toners is still quite good, the old toners can be used directly for development and printing. This can effectively reduce the amount of the waste toners, and can satisfy the requirements of environmental protection.

Further scope of the applicability of this disclosure will become apparent from the detailed description given hereinafter. However, it should be understood that the detailed description and specific examples, while indicating preferred embodiments of this disclosure, are given by way of illustration only, since various changes and modifications within the spirit and scope of this disclosure will become apparent to those skilled in the art from this detailed description.

DETAILED DESCRIPTION OF THE INVENTION

This disclosure will be apparent from the following detailed description, which proceeds with reference to accompanying drawings.

The traditional designers always think that the toners on the drum need to be cleaned before the drum is charged, but the present inventor has discovered that the toners on the drum cannot affect the charging quality of the drum, and thus overcome the conventional technical preconception to complete the following improved design.

Figure 1:
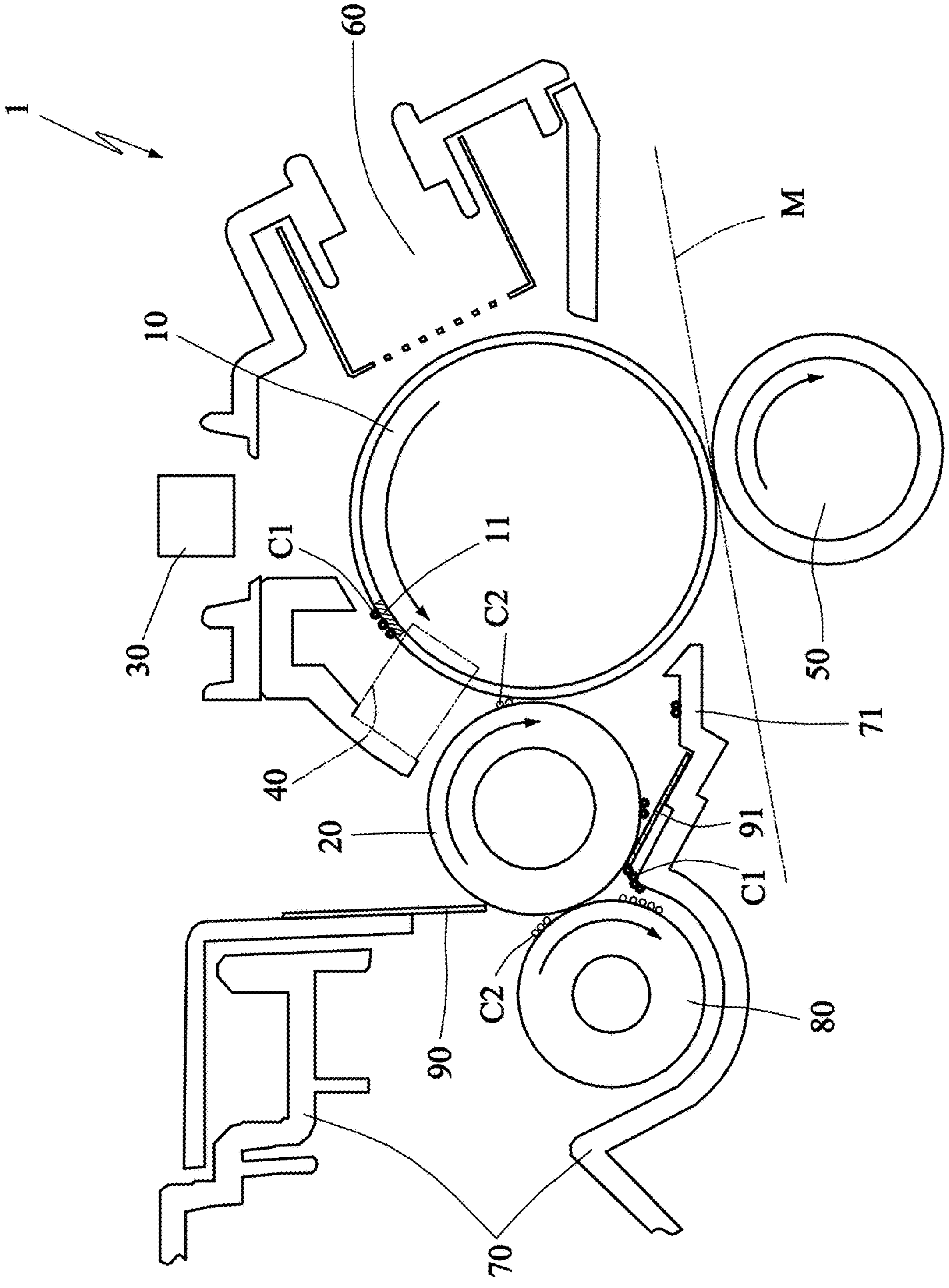
FIG. 1 is a schematic view showing a first state of a printer apparatus according to a preferred embodiment of this disclosure.
Figure 2:
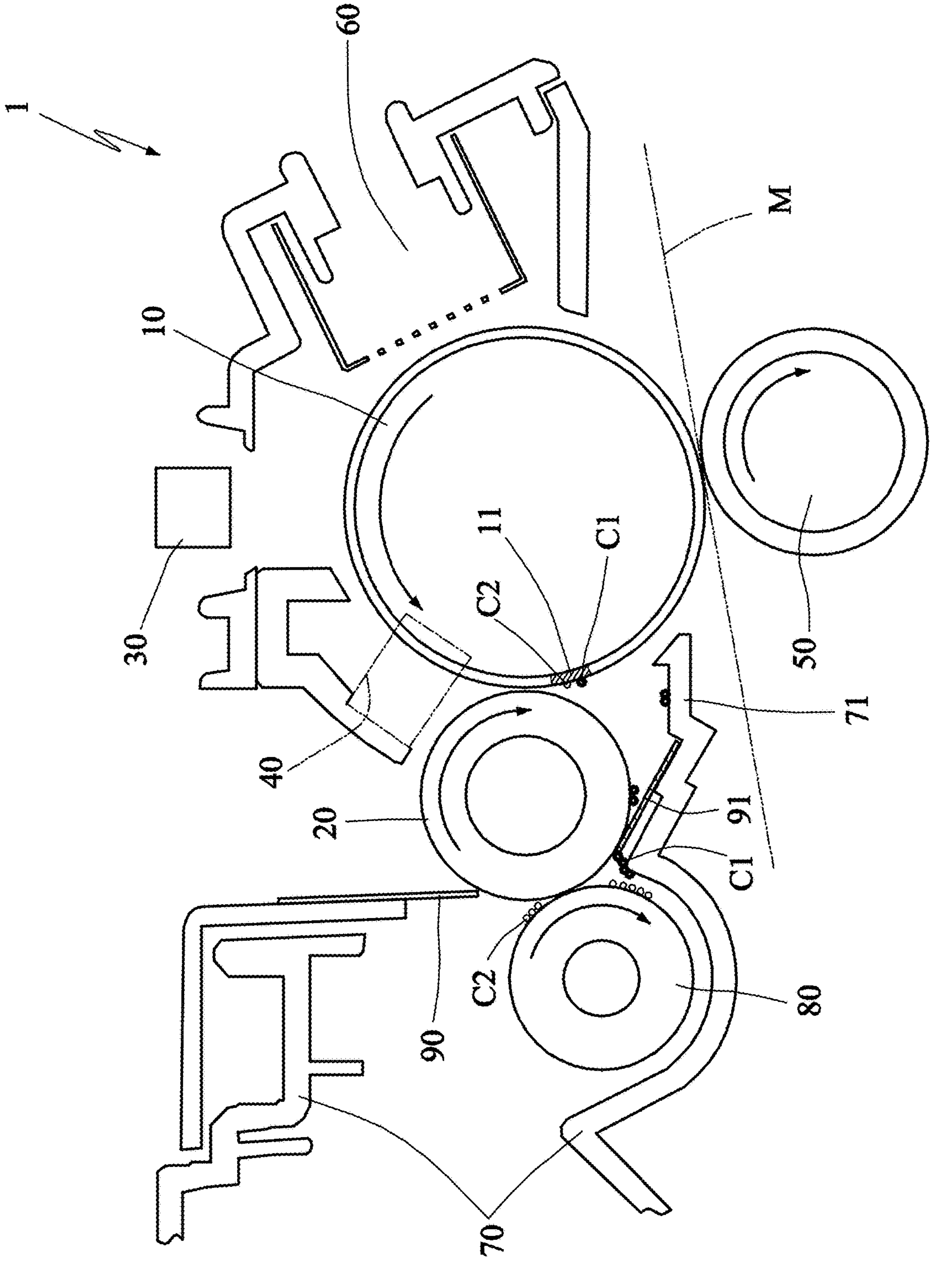
FIG. 2 is a schematic view showing a second state of the printer apparatus according to the preferred embodiment of this disclosure.

FIGS. 1 and 2 are schematic views respectively showing first and second states of a printer apparatus 1 according to a preferred embodiment of this disclosure. As shown in FIGS. 1 and 2, the printer apparatus 1 is a laser printer, which includes a drum 10, a development roller 20, a print head 30 and a cleaner 40.

The development roller 20 performs a developing operation on the drum 10, that is, the toners are attached to the drum 10. The print head 30 performs an exposure operation on the drum 10. The print head 30 includes, for example but without limitation to, a light emitting diode print head (LPH) or a laser scanning unit (LSU).

The cleaner 40 including, for example but without limitation to, a brush head, such as a hair brush, a foam brush and a scraper, performs a cleaning operation on the drum 10. After a light sensing part 11 of the drum 10 is rotated through the print head 30, the light sensing part 11 firstly passes through the cleaner 40, which cleans or loosens old toners C1 on the drum 10, and then passes through the development roller 20, which attaches new toners C2 to the drum 10. For example, the old toners C1 of the light sensing part 11 are cleaned in FIG. 1, and the new toners C2 are attached to the drum 10 in FIG. 2. That is, the cleaner 40 is disposed at a position downstream of the print head 30 and upstream of the development roller 20, and the cleaner 40 is in direct contact with the drum to clean the old toners or to loosen the attachment relationship or strength between the old toners and the drum. The loosened or cleaned old toners C1 may be attached to the drum 10 together with the new toners C2. That is, the old toners C1 is re-distributed over the drum 10. In other words, the cleaned or loosened old toners C1 are attached to the drum 10 by the development roller 20 together with the new toners C2. In an embodiment, a straight line connected to centers of axes of both the print head 30 and the development roller 20 passes through the cleaner 40, or intersects the cleaner 40.

The printer apparatus 1 may further include a transfer roller 50, a charger 60, a toner cartridge 70, a supply roller 80 and a scraper 90. The light sensing part 11 passes through the development roller 20, and then the transfer roller 50. The drum 10 and the transfer roller 50 cooperate with each other to transfer the new toners C2 from the drum 10 to a medium M transported past the drum 10 and the transfer roller 50. Then, the medium M can be subjected to a fixation process and then outputted. The charger 60 performs a charging operation on the drum 10. After the light sensing part 11 passes through the transfer roller 50, the light sensing part 11 firstly passes through the charger 60, and then the print head 30. The development roller 20 and the supply roller 80 are rotatably mounted in the toner cartridge 70.

In this embodiment, the toner cartridge 70 stores the new toners C2, and receives the old toners C1 brought back by the development roller 20. Thus, a portion of the old toners C1 may be directly reattached to the drum 10, and another portion of the old toners C1 can be recycled into the toner cartridge 70 by the development roller 20 which has a higher rotation speed. The scraper 90 is mounted on the toner cartridge 70, and contacts the development roller 20 to scrap a portion of the new toners C2.

Thus, in the printer apparatus 1 of this embodiment, no other cleaner is disposed between the transfer roller 50 and the charger 60, and a waste toner collecting bottle is omitted from the printer apparatus 1. This is significantly different from the prior art, so it is unnecessary to regularly recycle or replace the waste toner collecting bottle. In order to recycle the old toners C1, the toner cartridge 70 may be designed to have a ladder-like support portion 71, which is disposed below the development roller 20, supports the old toners C1 and has a free end formed with a hook to prevent the old toners C1 from falling off. In this example, a straight line connecting the cleaner 40 to the ladder-like support portion 71 passes through a nipping portion between the drum 10 and the development roller 20 so that the ladder-like support portion 71 can effectively receives the old toners C1. It is worth noting that only a few old toners C1 are supported. Compared with the prior art, the printer apparatus in this embodiment has an upstream toner recycling function.

In addition, an anti-reversal member 91 is fixed to the support portion 71, the anti-reversal member 91 is in friction contact with the development roller 20, and prevents the toners in the toner cartridge 70 form flowing out. The material of the anti-reversal member includes a plastic material. In one example, the angular velocities of the drum 10, the development roller 20 and the supply roller 80 are controlled through the designs of the mechanism and the reduction ratio of the gear set in conjunction with the outer diameters thereof to generate different tangential velocities. For example, the tangential velocity of the supply roller 80 is higher than the tangential velocity of the development roller 20, and the tangential velocity of the development roller 20 is higher than the tangential velocity of the drum 10. This is advantageous to the recycling of the toners. On the other hand, the development roller 20 and the supply roller 80 have the same rotation direction, so that friction between the development roller 20 and the supply roller 80 is generated to attach the toners to the development roller 20. Regarding an example of a material, the outer layer material of the supply roller 80 includes foam, the outer layer material of the development roller 20 includes rubber, and the material of the drum 10 includes an insulation material (Charge Transport Layer (CTL), which may be a plastic material), so that the friction coefficients of all of them are different to cause different friction forces (or surface energies). The friction force of the supply roller 80 is greater than the friction force of the development roller 20, and the friction force of the development roller 20 is greater than the friction force of the drum 10, thereby achieving the effect of development.

In an actual operation, when the printer apparatus 1 receives a print signal, the charger 60 is activated to perform the charging on the drum 10 (e.g., negative charges are accumulated on the drum). Next, the print head 30 is used to illuminate the drum 10 according to the print signal, and the negative charges are removed from the illuminated portion of the drum 10, wherein the illuminated portion is determined according to the image to be printed, and the toners are to be attached to the illuminated portion. Then, the cleaner 40 performs a cleaning operation on the residual toners on the drum 10, and may remove a portion of the residual toners and loosen another portion of the residual toners. Next, the supply roller 80 attaches the toners from the toner cartridge 70 to the development roller 20 in a relative frictional manner (the loosened residual toners and the new toners may be re-attached to the development roller 20). Because the toners carry the negative charges, the toners are attached to the drum 10 by the development roller 20 after the drum 10 is exposed. Because the illuminated portion of the drum 10 is not charged, the toners are attached to the portion of the drum 10 according to the electrostatic charge principle. The other portion of the drum 10 that is not illuminated carries the negative charges and repels the toners, so the toners are not attached to the drum 10. Next, one side of the medium M is in contact with the rotating drum 10, and the other side of the medium M is in contact with the transfer roller 50, so that the toners attached to the drum 10 are transferred to the medium M. At this time, the toners are only temporarily attached onto the medium M. Thus, the toners must be permanently fixed to the medium M through the heater roller and the pressure roller.

According to the above-mentioned embodiment, the cleaner may be provided between the print head and the development roller, to clean or loosen old toners on the drum, so that the old toners can be recycled, and the recycled old toners may be attached to the drum directly by the development roller with the new toners, and may be recycled into the toner cartridge. Because the quality of nearby recycled old toners is still quite good, the old toners can be used directly for development and printing. This can effectively reduce the amount of the waste toners, and can satisfy the requirements of environmental protection.

While this disclosure has been described by way of examples and in terms of preferred embodiments, it is to be understood that this disclosure is not limited thereto. To the contrary, it is intended to cover various modifications. Therefore, the scope of the appended claims should be accorded the broadest interpretation so as to encompass all such modifications.

The invention claimed is:

1. A printer apparatus, comprising:

a drum;

a development roller performing a developing operation on the drum;

a print head performing an exposure operation on the drum;

a cleaner performing a cleaning operation on the drum, wherein after a light sensing part of the drum is rotated through the print head, the light sensing part firstly passes through the cleaner, which cleans or loosens old toners on the drum, and then the light sensing part passes through the development roller, which attaches new toners to the drum;

a transfer roller, wherein the light sensing part passes through the development roller and then the transfer roller, wherein the drum and the transfer roller cooperate with each other to transfer the new toners from the drum to a medium transported past the drum and the transfer roller; and a charger performing a charging operation on the drum, wherein after the light sensing part passes through the transfer roller, the light sensing part firstly passes through the charger and then the print head, wherein there is no another cleaner disposed between the transfer roller and the charger.

2. The printer apparatus according to claim 1, further comprising a toner cartridge and a supply roller, wherein the development roller and the supply roller are rotatably mounted in the toner cartridge.

3. The printer apparatus according to claim 2, wherein the toner cartridge stores the new toners, and receives the old toners brought back by the development roller.

4. The printer apparatus according to claim 2, further comprising a scraper, which is attached to the toner cartridge, and contacts the development roller to scrape a portion of the new toners.

5. The printer apparatus according to claim 2 without a waste toner collecting bottle.

6. The printer apparatus according to claim 2, wherein the toner cartridge has a ladder-like support portion supporting the old toners.

7. The printer apparatus according to claim 1 being a laser printer, wherein the cleaned or loosened old toners and the new toners are attached to the drum by the development roller.

* * * * *